US005745324A

United States Patent [19]
Forsland et al.

[11] Patent Number: 5,745,324
[45] Date of Patent: Apr. 28, 1998

[54] ELECTROSTATIC DISCHARGE AND EXCESSIVE VOLTAGE PROTECTION CIRCUIT

[75] Inventors: Bruce M. Forsland, Santa Clara; Kim T. Rubin, Menlo Park, both of Calif.

[73] Assignee: Greenspring Computers, Inc., Menlo Park, Calif.

[21] Appl. No.: 754,218

[22] Filed: Nov. 20, 1996

[51] Int. Cl.⁶ ........................................ H02H 9/00
[52] U.S. Cl. .................. 361/56; 361/111; 361/118; 361/127
[58] Field of Search ................... 361/56, 91, 111, 361/117, 118, 119, 127

[56] References Cited

U.S. PATENT DOCUMENTS

| | | | |
|---|---|---|---|
| 4,547,795 | 10/1985 | Wulff | 357/80 |
| 4,796,080 | 1/1989 | Phy | 357/70 |
| 4,841,259 | 6/1989 | Mayer | 333/17.2 |
| 5,089,929 | 2/1992 | Hilland | 361/111 |
| 5,159,518 | 10/1992 | Roy | 361/56 |

*Primary Examiner*—Brian K. Young
*Assistant Examiner*—Stephen Jackson
*Attorney, Agent, or Firm*—Gary S. Williams; Flehr Hohbach Test Albritton & Herbert LLP

[57] ABSTRACT

An input protection circuit protects semiconductor circuits from ESD voltages and excessive voltages. The protection circuit includes an input/output node, a resistor (or other resistive element), and a varistor. The resistor has a first end coupled to the input/output node and a second end coupled to a port of the protected circuit. The varistor has a first end coupled to a ground node and a second end coupled to the second end of the resistor. The electronic circuit is coupled to the second end of the resistor and the second end of the varistor.

16 Claims, 2 Drawing Sheets

ELECTROSTATIC DISCHARGE AND EXCESSIVE VOLTAGE PROTECTION CIRCUIT

The present invention relates generally to MOS semiconductor circuits, and particularly to a circuit for providing protection to electronic circuits from Electro-Static Discharge (ESD) and excessive voltages.

BACKGROUND OF THE INVENTION

The purpose of a protection circuit is to protect electronic circuits from the potentially destructive effects of large ESD or excessive voltages applied to input and output lines. Typically, the ESD voltage source is a human, who first builds up a charge on his body through mechanical motion against surfaces such as carpets or chairs. The human then touches a conductive line, such as a connector pin. The built-up charge is then rapidly discharged through the line, through the electronic circuit, and ultimately back to ground. In the process, the electronic circuit may be damaged.

In some applications, such as laboratories, factories, and engineering locations, there is also a reasonable chance that a voltage source other than a charged human may be connected improperly to the electronic circuit through a conductive line. In this situation, the electronic circuit may be damaged due to the excessive voltage traveling through the electronic circuit.

Increased use of CMOS, small geometry ICs, and electronic equipment in the home and office has in recent years increased both the sensitivity of the equipment and the exposure of this equipment to possible damage. As manufacturers try to increase the reliability of equipment, damage due to ESD has become an increased concern.

Many different protection circuits exist in the prior art. Most protection circuits use a combination of resistors, diodes, and MOSFETs. As shown in FIG. 1, most prior art protection circuits use a series input resistor R1 to reduce the ESD voltage by dropping some of the voltage across the resistor. The value of the input resistors used in the prior art ranges from as high as 2 k ohms to as low as 20 ohms. The protection circuits of FIG. 1 uses a single input diode to absorb ESD voltages. However, problems with the use of a single input diode can arise when the ESD voltage reverse biases the diode. The diode clamps the input voltage at its reverse break down voltage. Unfortunately, the reverse break down voltage of the diode is typically higher than the break down voltage of the device's transistor gates. Therefore the input gates may be destroyed before the diode reacts.

Referring to FIG. 2, protection circuits are typically tested using a test circuit such as circuit 22. In the test circuit 22 shown, typically, a storage capacitor C2 of 200 picofarads is used, with a series resistor R2 of 1500 ohms. Thus the time constant of this test circuit is 300 nanoseconds.

The test circuit shown in FIG. 2 is sometimes called the Human Body Model, because it simulates the effect of a person accumulating a static charge and then touching an integrated circuit. The Operation of the Human Body Model ESD circuit, shown in FIG. 2, is generally as follows: Switch S1 is closed and switch S2 is open. Voltage source V2 is generally a controllable voltage source which can generate any selected voltage level in a predefined range, such as −5000 to +5000 volts. The voltage source V2 charges the storage capacitor C2 to a selected voltage level, such as +2000 volts. Once the capacitor C2 is charged, the stored charge is delivered to the INPUT PAD by opening switch S1 and then closing switch S2. This sequence is generally repeated a number of times so that the device or equipment under test is subject to a number of pulses.

A variation on the above model includes defined non-zero pulse rise time (not shown in FIG. 2). The voltage source, size of the storage capacitor, the output impedance, the pulse repetitions rate and the total number of pulses generated are all common variables in this model. Typical voltages are in the range of 2 k volts to 20 k volts. Output impedance can vary from zero ohms to 20 k ohms. It is possible and reasonable to calculate the total energy transferred for each pulse and the aggregate energy transferred in a stream of pulses. Clearly, this model is time-varying. Variations include non-linear output impedance, for example, an air spark gap. Another commonly used test circuit, sometimes called the machine model, eliminates resistor R2 in the test circuit 22, simulating the coupling of an integrated circuit to a machine with an accumulated static charge.

FIG. 3 depicts the schematic of an input protection circuit which is similar to the one in FIG. 1, but which uses two complementary input diodes D1 and D2 and two MOS transistors M1 and M2. FIG. 3 also depicts a portion of the bipolar model, with transistors Q1 and Q2. The primary motivation for using two complementary input diodes and their associated transistors is to facilitate the absorption of both positive and negative ESD voltages and currents.

More specifically, upon the occurrence of an ESD, one of the two diode and MOS transistor pairs (depending on the polarity of the ESD voltage) will turn on at the forward turn on voltage of the diode (approximately 0.7 volts). The bulk of the ESD current will go through the forward biased diode.

In summary, the protection devices currently in use have been less than satisfactory because they provide insufficient protection against large ESDs.

It is therefore a primary object of the present invention to provide an improved protection device that can absorb large ESD voltages.

SUMMARY OF THE INVENTION

In summary, the present invention is an input protection circuit for protecting electronic circuits from ESD and excessive voltages. The protection circuit includes an input/output node, a resistor or other resistive element, and a varistor. The resistor has a first end coupled to the input/output node and a second end coupled to the electronic circuit. The varistor has a first end coupled to a ground node and a second end coupled to the second end of the resistor.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

For the purposes of this description, the term Vcc refers to the high voltage source used in a circuit (e.g., 5 volts in many circuits) and Vss refers to the low voltage source used in the circuit (e.g., 0 volts or ground).

Figure 1:
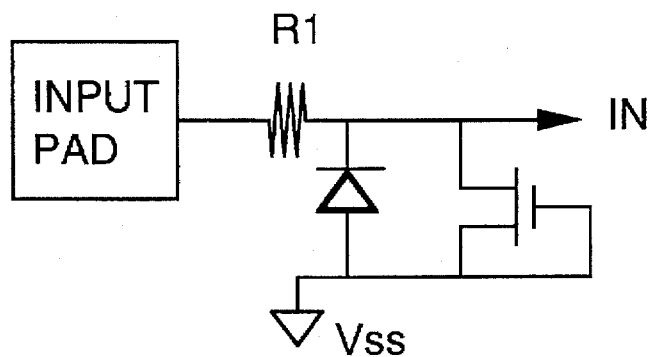
FIG. 1 depicts a prior art input protection device.
Figure 2:
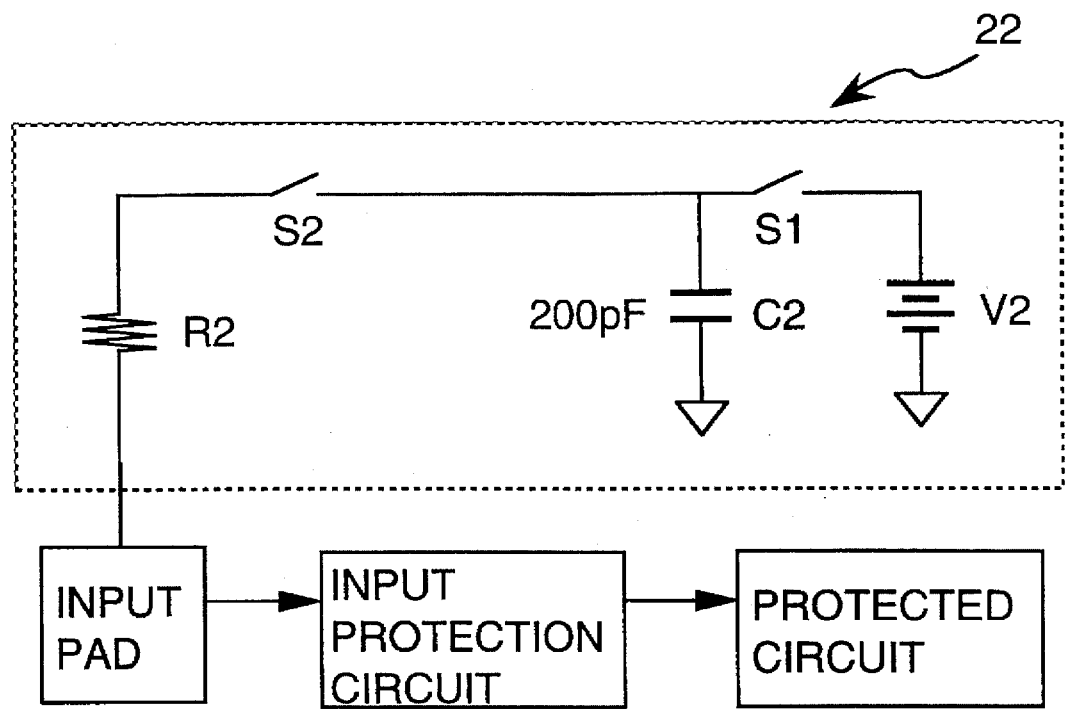
FIG. 2 schematically depicts a prior art electrostatic discharge test circuit.
Figure 3:
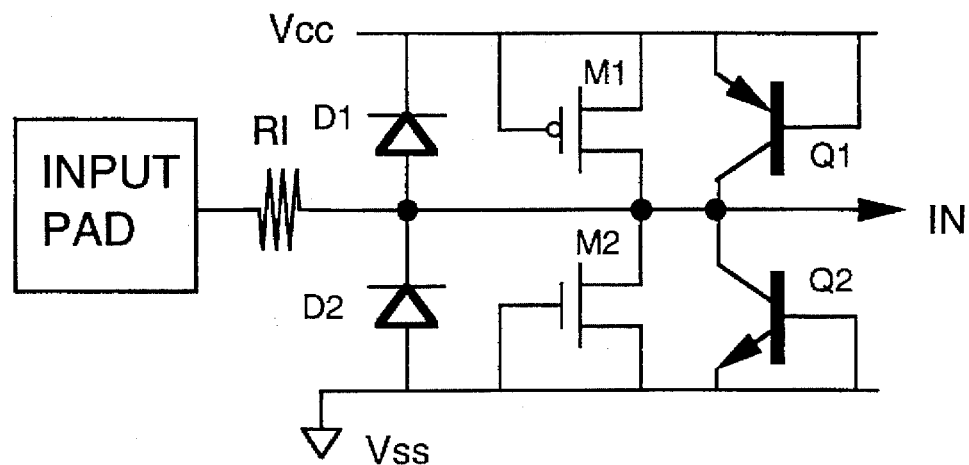
FIG. 3 depicts a prior art input protection circuit using complementary input diodes, and the corresponding parasitic bipolar transistor model.
Figure 4:
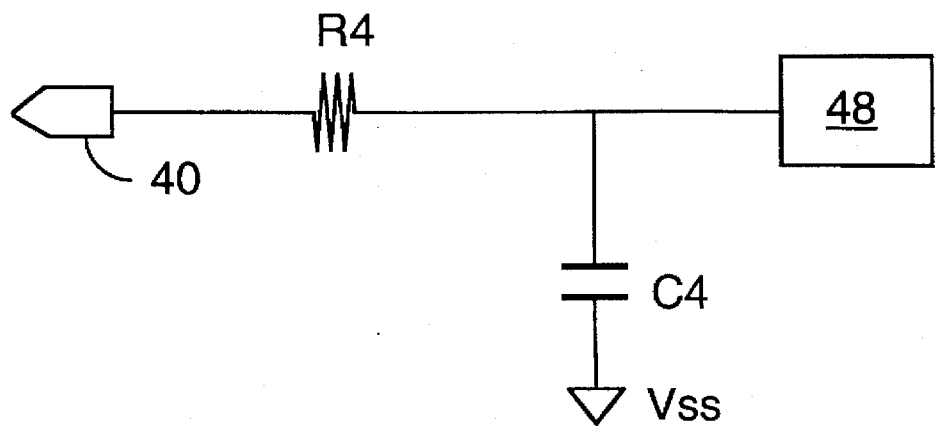
FIG. 4 schematically depicts one preferred embodiment of an input protection device in accordance with the present invention.

Referring to FIG. 4, there is shown a circuit profile of the present invention. Five elements are used in the circuit of the present invention.

The first element is an input/output line 40. The input/output line 40 may receive or transmit digital or analog signals. The input/output line 40 may be internal or external to a piece of equipment or system. Electro-static discharges, excessive voltages, and excessive currents enters the circuit through the input/output line 40. The ESD, excessive voltages, and excessive currents are measured between the input/output line 40 and a ground node (Vss).

The second element is a resistor R4. The resistor R4 has a first end and a second end. The first end of the resistor R4 is coupled to the input/output line 40. The second end of the resistor R4 is coupled to an electronic circuit 48. The resistor R4 has a wide range of applicable values depending on the requirements of the applications. Typically, the resistor R4 has a range of values between 33 ohms and 2 k ohms. The resistor R4 may be selected for (1) DC impedance, (2) maximum breakdown voltage, (3) maximum power handling, and (4) factors affecting manufacturability such as price, size, and level of integration. Any element that behaves like a resistor, that is any element that exhibits some impedance at the frequencies of interest, may be used. The resistor R4 provides several benefits. It limits both the maximum current and the maximum voltage seen the by the electronic component. It performs these functions by acting as a voltage divider, considering both the impedance of the source and the impedance of the electronic circuit 48. This is true for both AC and DC operation, although the quantitative effects for AC and DC are substantially different. It also serves to reduce both the rise time and maximum amplitude of ESD pulses by virtue of the inherent capacitance of both the varistor C4 and the electronic circuit 48. The resistor R4 also serves to absorb and dissipate a significant amount of the total energy provided by the ESD source, voltage source or the current source. An indirect advantage of the function of the resistor R4 is that it reduces the degradation of the varistor C4 in response to repetitive pulses and provides increased total protection of the system to repetitive pulses. This in turn provides longer finished product life.

The third element is a varistor C4. The varistor C4 has a first end and a second end. The first end of the varistor C4 is coupled to a ground. The second end of the varistor C4 is coupled to the resistor R4 and the electronic circuit 48. The varistor C4 can be any element that exhibits some capacitance under normal operation and a low impedance at voltages higher than normal circuit operation. The varistor has a wide range of applicable values depending on the requirements of the applications. Typically, the varistor has a range of values between 47 picofarads and 1000 picofarads. The varistor is preferably made from ceramic semiconducting materials, most preferably Zinc Oxide. The trade name of one such component manufactured by AVX corporation is "TransGuard." The varistor may be selected for (1) breakdown voltage, (2) nominal capacitance under normal operation, (3) leakage current under normal operation, (4) maximum power handling, (5) rise-time response or effective latency, (6) degradation characteristics, (7) factors affecting manufacturability, including price, size, and level of integration. Typically, these factors are not independent. In particular, the capacitance and breakdown voltage may be closely related. The power handling and size may also be closely related.

There are multiple factors that impact the selection of the resistor R4 and varistor C4. The primary ones are (1) known or expected characteristics of the electronic circuit, (2) input or output function, (3) data rate, (4) operating voltage, (5) digital or analog line function, (6) level of desired ESD protection, (7) level of desired over-voltage protection, (8) level of total energy handling capability, and (9) manufacturing cost and other manufacturing criteria. In particular, in a preferred embodiment the varistor C4 is selected or manufactured so as to have a threshold voltage (i.e., the lowest voltage at which it begins to operate as a low impedance connection instead of as a capacitor) at a predefined voltage level that is higher than the protected electronic circuit's highest normal operating voltage for the circuit port to which the protection circuit is coupled but lower than the lowest voltage known to cause damage to the protected electronic circuit.

In a preferred embodiment, an instance of the protection circuit of the present invention is coupled to every port (input, output, and power supply) of the protected circuit, except the ground node port, so as to protect the electronic circuit from all possible sources of destructive discharges, voltages and currents.

The present invention is equally applicable to discrete circuit implementations (in which the protection circuits are composed of discrete elements outside the package housing the protected circuit), integrated packaging implementations (in which the protection circuits are composed of discrete elements that are positioned inside the package housing the protected circuit), integrated circuit implementations (in which the protection circuits are formed on the same semiconductor substrate as the protected circuit), and combinations thereof (e.g., where portions of the protection circuits are inside the package housing the protected circuit or formed on the same substrate as the protected circuit and other portions of the protection circuits are not).

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A protection circuit for providing protection to an electronic circuit from electro-static discharge, the circuit comprising:

an input/output node;

a resistive element having a first end coupled to said input/output node and a second end coupled to a port of said electronic circuit; and a varistor having a first end coupled to a ground node and a second end coupled to the second end of said resistive element.

2. The protection circuit as set forth in claim 1, wherein the varistor has a capacitance being in the range of 47 picofarads to 1000 picofarads.

3. The protection circuit as set forth in claim 1, wherein said varistor is made from zinc oxide.

4. The protection circuit as set forth in claim 1, wherein said varistor has a threshold voltage that is higher than a predefined highest normal operating voltage for said port of said protected circuit, but lower than a predefined lowest voltage known to cause damage to the protected electronic circuit.

5. The protection circuit as set forth in claim 1, wherein the resistive element has an impedance of less than 2 k ohms.

6. The protection circuit as set forth in claim 5, wherein the varistor has a capacitance being in the range of 47 picofarads to 1000 picofarads.

7. The protection circuit as set forth in claim 6, wherein said varistor is made from zinc oxide.

8. The protection circuit as set forth in claim 7, wherein said varistor has a threshold voltage that is higher than a predefined highest normal operating voltage for said port of said protected circuit, but lower than a predefined lowest voltage known to cause damage to the protected electronic circuit.

9. Protection circuitry for providing protection to an electronic circuit from electro-static discharge, said electronic circuit having a plurality of input/output ports, the protection circuitry comprising:

a plurality of protection subcircuits, each coupled to a respective one said electronic circuit's input/output ports, each protection subcircuit including:

an input/output node;

a resistive element having a first end coupled to said input/output node and a second end coupled to a respective input/output port of said electronic circuit; and a varistor having a first end coupled to a ground node and a second end coupled to the second end of said resistive element.

10. The protection circuitry as set forth in claim 9, wherein the varistor has a capacitance being in the range of 47 picofarads to 1000 picofarads.

11. The protection circuitry as set forth in claim 9, wherein said varistor is made from zinc oxide.

12. The protection circuitry as set forth in claim 9, wherein said varistor has a threshold voltage that is higher than a predefined highest normal operating voltage for said port of said protected circuit, but lower than a predefined lowest voltage known to cause damage to the protected electronic circuit.

13. The protection circuitry as set forth in claim 9, wherein the resistive element has an impedance of less than 2 k ohms.

14. The protection circuitry as set forth in claim 13, wherein the varistor has a capacitance being in the range of 47 picofarads to 1000 picofarads.

15. The protection circuitry as set forth in claim 14, wherein said varistor is made from zinc oxide.

16. The protection circuitry as set forth in claim 15, wherein said varistor has a threshold voltage that is higher than a predefined highest normal operating voltage for said port of said protected circuit, but lower than a predefined lowest voltage known to cause damage to the protected electronic circuit.

* * * * *